US010247031B2

(12) United States Patent
Carter et al.

(10) Patent No.: US 10,247,031 B2
(45) Date of Patent: Apr. 2, 2019

(54) WAVEGUIDE

(71) Applicant: ROLLS-ROYCE plc, London (GB)

(72) Inventors: Neal Carter, Derby (GB); Francis Bridge, Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 532 days.

(21) Appl. No.: 14/971,499

(22) Filed: Dec. 16, 2015

(65) Prior Publication Data

US 2016/0177778 A1 Jun. 23, 2016

(30) Foreign Application Priority Data

Dec. 23, 2014 (GB) .................................. 1423020.5

(51) Int. Cl.
| G01B 7/14 | (2006.01) |
| H01P 3/14 | (2006.01) |
| F01D 11/08 | (2006.01) |
| F01D 21/00 | (2006.01) |
| F01D 25/26 | (2006.01) |
| F04D 27/00 | (2006.01) |
| F04D 29/52 | (2006.01) |

(52) U.S. Cl.
CPC ............ *F01D 21/003* (2013.01); *F01D 11/08* (2013.01); *F01D 25/26* (2013.01); *F04D 27/001* (2013.01); *F04D 29/522* (2013.01); *G01B 7/14* (2013.01); *H01P 3/14* (2013.01); *F05D 2220/32* (2013.01); *F05D 2240/11* (2013.01)

(58) Field of Classification Search
CPC ................................ F01D 21/003; F01D 25/26
See application file for complete search history.

(56) References Cited

U.S. PATENT DOCUMENTS

| 3,261,953 | A | * | 7/1966 | Tilman | ..................... H01H 9/52 200/288 |
| 4,330,234 | A | * | 5/1982 | Colley | ..................... F01D 11/22 415/127 |
| 4,384,819 | A | | 5/1983 | Baker | |
| 4,507,658 | A | | 3/1985 | Keating | |
| 5,411,364 | A | | 5/1995 | Aberg et al. | |

(Continued)

FOREIGN PATENT DOCUMENTS

| JP | H08-288710 A | 11/1996 |
| WO | 2009/082282 A1 | 7/2009 |

OTHER PUBLICATIONS

Jun. 20, 2016 Search Report issued in European Patent Application No. 15200089.

(Continued)

*Primary Examiner* — Richard A Edgar
(74) *Attorney, Agent, or Firm* — Oliff PLC

(57) ABSTRACT

A waveguide for a sensor system for mounting in a casing structure to measure the clearance between the casing structure and a rotary blade. The casing structure, which may be a turbine casing structure, includes a radially outer casing portion and a radially inner casing portion (e.g. a segment seal). The waveguide includes a radially outer portion for mounting in the radially outer casing portion and a radially inner portion for mounting in the radially inner casing portion. The two portions are sealed together and bridged by a sealing portion having a deformable portion.

13 Claims, 5 Drawing Sheets

(56) References Cited

U.S. PATENT DOCUMENTS

| | | | |
|---|---|---|---|
| 8,573,078 B2* | 11/2013 | Sue | F01D 17/02 |
| | | | 73/865.8 |
| 2009/0128166 A1 | 5/2009 | Webster | |
| 2010/0066387 A1* | 3/2010 | Bosselmann | G01B 7/14 |
| | | | 324/644 |
| 2011/0194122 A1 | 8/2011 | Heyworth et al. | |
| 2012/0125131 A1 | 5/2012 | Sue et al. | |

OTHER PUBLICATIONS

May 15, 2015 Search Report issued in Great Britain Patent Application No. 1423020.5.

* cited by examiner

WAVEGUIDE

CROSS-REFERENCE TO RELATED APPLICATIONS

This application is based upon and claims the benefit of priority from British Patent Application Number 1423020.5 filed 23 Dec. 2014, the entire contents of which are incorporated by reference.

BACKGROUND

1. Field of the Disclosure

The present disclosure relates to a waveguide. In particular, aspects of the present disclosure relates to a waveguide for use in a sensor system for monitoring the clearance between a moving member such as a rotary blade and a casing structure within which the moving member is moving e.g. a turbine casing of a gas turbine engine.

2. Description of the Related Art

It is desirable to monitor the clearance between the tip of a rotary blade and a casing of a gas turbine engine to monitor positional/dimensional shifts in turbine components and to provide feedback for tip clearance control (TCC) systems which regulate expansion or contraction of the turbine casing (which affects the clearance between the rotary blade tips and the turbine casing).

A system for measuring/monitoring the clearance between a moving member such as a rotary/aerofoil blade and casing structure e.g. a turbine casing is described in US2011/0194122. Such systems generate a microwave signal which is directed in a radially inwards direction through a waveguide extending through the turbine casing. Portions of the signal are reflected radially outwards through the waveguide by a reference feature within the waveguide, by the casing surface and by the tips of the aerofoil blades as they move (rotate) within the turbine casing. The reflected signal portions are processed using standard signal distance measuring techniques such as interferometry or time of flight measurement which use the relative phase and/or timing of the signal portions to determine the relative positions of the various elements.

The waveguide used in this known system is typically a single-piece, metallic element that is inserted through the turbine casing after assembly of the turbine. Once fitted, it may be a permanent feature or it may be replaceable.

A turbine casing typically comprises a radially outer casing portion formed of forged steel or nickel alloys for withstanding the internal gas pressures within the turbine. This outer casing is lined with seal segments which seal the rotor path and, in some cases, form or are provided with an abradable layer into which the rotary blades can cut to form a circumferentially extending channel with a view to minimising tip clearance. The seal segments are usually but not exclusively mounted onto the outer casing by segment carriers.

A problem with this known system is that the waveguide is rigid and thus axial movement between the outer casing, seal segments and segment carriers of the turbine casing cannot be accommodated. Furthermore, since the waveguide is inserted through the turbine casing after manufacture, sealing around the waveguide is problematic and effective sealing of the gas flow path to prevent leakage of gas/heat through the turbine casing can be difficult to achieve.

OBJECTS AND SUMMARY

There is the need for a waveguide that can be used in clearance sensing systems in gas turbine engines that can accommodate axial movement of the casing elements and that minimise leakage of gas and heat from the gas flow path.

In a first aspect, there is provided a waveguide for a sensor system for mounting in a casing structure, the casing structure comprising a radially outer casing portion and a radially inner casing portion, said waveguide comprising:
a radially outer portion for mounting in the radially outer casing portion;
a radially inner portion for mounting in the radially inner casing portion; and
a sealing portion,
wherein the sealing portion is for bridging and sealing against the radially inner and radially outer portions, the sealing portion comprising a deformable portion.

In a second aspect, there is provided a casing structure comprising a radially outer casing portion and a radially inner casing portion, the casing structure housing a waveguide according to the first aspect wherein the radially outer portion is mounted in the radially outer casing portion and the radially inner portion is mounted in or integral with the radially inner casing portion.

In a third aspect, there is provided a sensor system for measuring the clearance between a rotary blade and a casing structure according to the second aspect.

Such a sensor system may comprise:
a transmitter for transmitting an electromagnetic signal;
a waveguide according to the first aspect coupled with the transmitter for guiding the electromagnetic signal radially inwards through the casing structure and for guiding a reflected electromagnetic signal radially outward through the casing structure; and
a receiver for receiving the reflected signal.

By providing a waveguide having two radially separated portions bridged by a sealing portion having a deformable portion, axial movement between the radially outer casing portion and the radially inner casing portion (e.g. a seal segment) can be accommodated by deformation of the deformable wall. The provision of two radially separated portions further allows the radially inner portion to be incorporated into the radially inner casing portion (e.g. segment seal) during engine assembly rather than after assembly. This allows more control over gas/pressure leakage prevention around the waveguide at its radially inner end. The sealing portion ensures an effective gas/pressure seal is formed between the two portions.

Optional features of the invention will now be set out. These are applicable singly or in any combination with any other aspect.

The radially inner casing portion may be a segment seal. The radially inner casing portion (e.g. segment seal) may be radially spaced from the radially outer casing portion e.g. by a segment carrier.

The radially outer portion may comprise an enlarged sealing plug at its radially outermost end. It is envisaged that the radially outer portion will be inserted into a casing bore in the radially outer casing portion after assembly of the engine portion e.g. after assembly of the turbine. The enlarged sealing plug will be used to assist location of the radially outer portion in the radially outer casing portion and to seal the radially outer casing bore at its radially outermost end. The radially outer portion may comprise a tubular portion at its radially innermost end for insertion into the casing structure through the outer casing bore. The enlarged sealing plug may have a greater radius/axial dimension than the tubular portion and outer casing bore.

The radially outer portion may comprise a threaded portion for mating engagement with the casing bore of the radially outer casing portion. The threaded portion may be provided on a shoulder portion between the sealing plug and the tubular portion. In other embodiments, the radially outer portion is welded to the radially outer casing portion.

The radially outer portion (which may be formed, for example, from metallic or ceramic material) may comprise an annular flange e.g. extending from the tubular portion for connection to the sealing portion.

The radially inner portion may comprise a threaded portion for mating engagement with the radially inner casing portion. The radially inner portion may comprise a sleeve portion at its radially innermost end for lining a radially inner casing bore. In some arrangements, the sleeve portion may comprise a threaded surface for mating engagement with the radially inner casing portion/segment seal (e.g. for engagement with a radially inner casing bore). The sleeve portion and/or the radially inner casing bore may comprise a protective coating that keeps the sleeve portion from contacting the inner casing bore.

The radially inner portion may further comprise a head portion at its radially outermost end, the head portion having an increased diameter/axial dimension compared to the sleeve portion. In some arrangements, the head portion may provide a mounting surface (which may be planar or angled) for sealing against to the sealing portion.

The radially inner portion (e.g. the sleeve and/or head portion) may be welded to the radially inner casing portion/segment seal. In other arrangements, the radially inner portion is integrally formed with the radially inner casing portion/segment seal. As discussed above, because the radially inner portion may be affixed to the radially inner casing portion/segment seal during engine assembly (or may even be integral with the radially inner casing portion/segment seal) leakage around the radially inner end of the waveguide can be minimised.

The radially inner and outer portions both have a respective bore for passage of the electromagnetic signal generated by the sensor system. In some arrangements, the bore of the radially inner portion may have smaller diameter than the bore of the radially outer portion. In this way, a step may be created between the two portions where the change in bore diameter occurs, the step functioning as a reference feature for reflection of the electromagnetic signal of the sensor system. In other arrangements, the bores in the two portions may have an equal diameter and a reference feature may be provided within the bore of the radially inner or radially outer portion.

Either or both of the bores in the radially inner/outer bores could be at least partially filled with a material that permits the passage of the electromagnetic signal (e.g. magnesium spinel). The point(s) of change of impedance between materials or from material to air (or vice versa) can be used as a reference feature (as described in US2011/0194122).

In some arrangements, there may be a radial spacing/gap between the radially inner and radially outer portions (e.g. between the tubular portion and the head portion). This facilitates relative movement of the two portions in the event of axial movement of the casing elements. The radially inner portion e.g. the head portion of the radially inner portion may comprise a groove for receiving the radially inner ends of tubular portion of the radially outer portion. The groove may be spaced from the bore of the radially inner portion or it may be contiguous with the bore.

The sealing portion may be affixed to the radially outer portion and the deformable portion biases the sealing portion against the radially inner portion. The sealing portion may act to create a gas/pressure seal between the two portions.

The deformable portion may be radially-extending. The deformable portion may be resilient such that it returns to its original configuration after deformation.

The deformable portion may comprise a flexible or corrugated wall. The sealing portion may be entirely defined by deformable (e.g. flexible or corrugated) walls such that the sealing portion forms a bellows structure.

The deformable portion may be a spring portion. For example, the spring portion may be affixed to the radially outer portion. In these embodiments, the radially outer portion may comprise a skirt portion (e.g. depending from the shoulder portion) for retaining the spring portion.

The sealing portion may comprise an annular mounting portion for abutment with the radially inner portion (e.g. with the mounting surface of the head portion of the radially inner portion). This annular mounting portion is a rigid portion which abuts and is biased against the mounting surface by the deformable portion (e.g. spring or bellows) of the sealing portion.

The annular mounting portion may be an annular mounting ring (e.g. affixed to the radially inner end of the bellows) or it may be radially extending to form an annular mounting wall (e.g. affixed to the radially inner end of the spring).

The sealing portion may be permanently attached (e.g. by welding) to the radially outer portion For example, the deformable bellows may be affixed to the annular flange of the radially outer portion or the spring portion may be affixed to the shoulder portion of the radially outer portion.

The casing structure may be a fan casing structure, compressor casing structure or turbine casing structure for a gas turbine engine.

The sensor system may be for measuring the clearance between a rotary blade and a fan casing structure, compressor casing structure or turbine casing structure in a gas turbine engine. The sensor system may, for example, be as described in US 2011/0194122.

In a fourth aspect, there is provided a rotor stage (for example a turbine or compressor) for a gas turbine engine, the rotor stage having a waveguide according to the first aspect, and/or a casing structure according to the second aspect and/or a sensor system according to the third aspect.

In a fifth aspect, there is provided a gas turbine engine having a waveguide according to the first aspect, and/or a casing structure according to the second aspect, and/or a sensor system according to the third aspect and/or a turbine according to the fourth aspect.

BRIEF DESCRIPTION OF THE DRAWINGS

Arrangements will now be described by way of example with reference to the accompanying drawings in which.

DETAILED DESCRIPTION OF EMBODIMENTS

Figure 1:
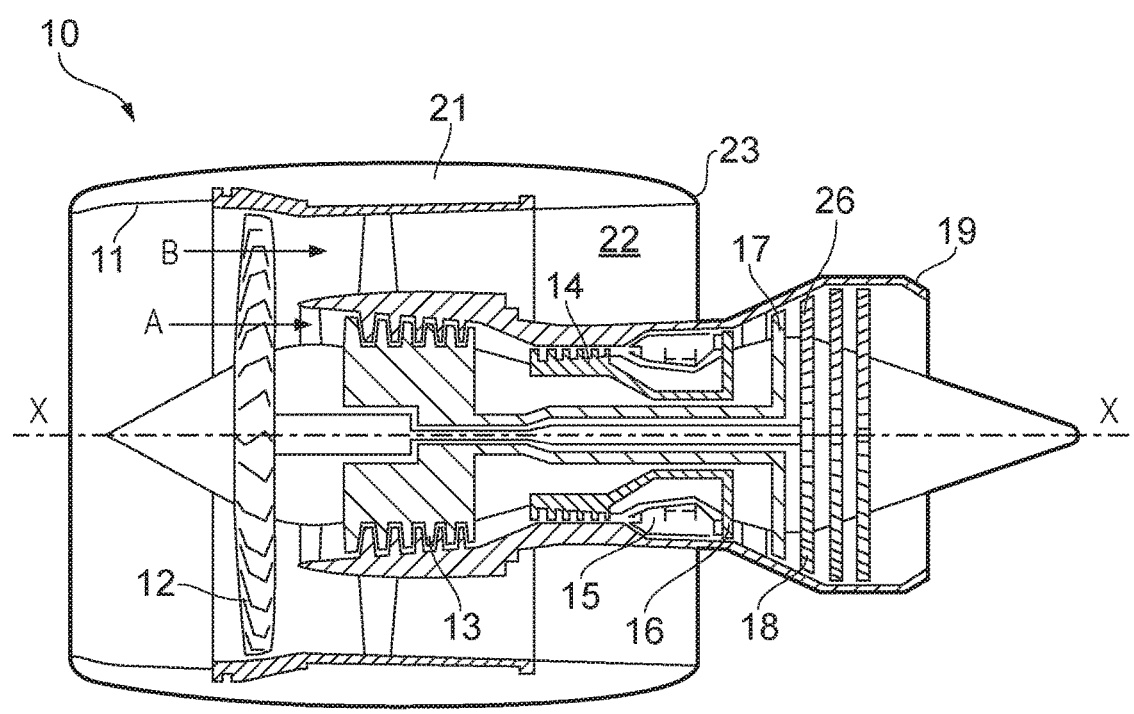
FIG. 1 shows a ducted fan gas turbine engine incorporating the arrangements of the present disclosure.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
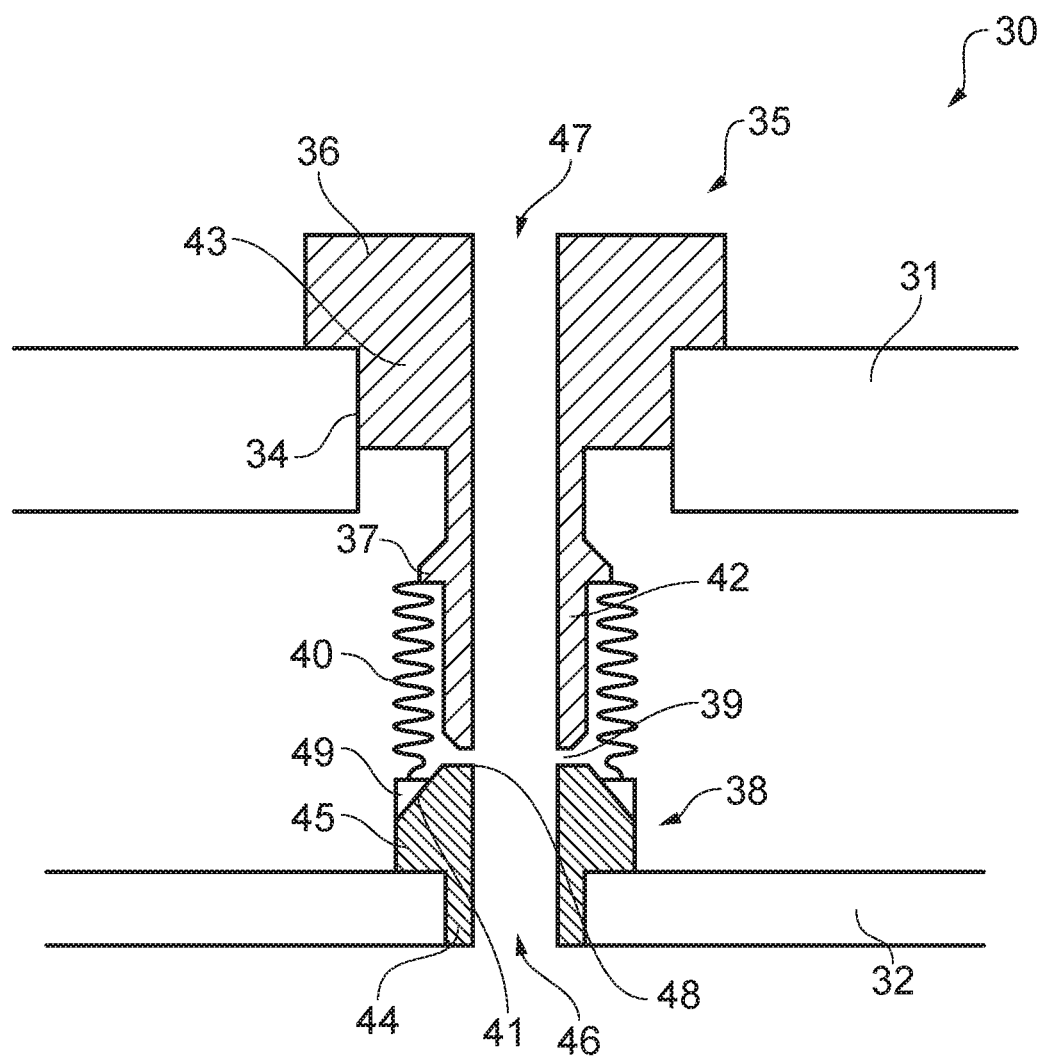
FIG. 2 shows a cross-section through the casing structure of a high pressure turbine according to a first arrangement.

As shown in FIG. 2, the high pressure turbine 16 comprises a turbine casing structure 30 comprising a radially outer casing portion 31 which may be formed of forged steel or nickel alloys in order to resist the pressure of gases within the turbine 16 and a series of radially inner segment seals 32 (one shown), each segment seal being mounted on the radially outer casing portion 31.

The radially outer casing portion 31 has a radially outer casing bore which has a threaded surface 34 for mating with a corresponding threaded surface on a radially outer portion 35 of a waveguide.

The radially outer portion 35 comprises an enlarged sealing plug 36 at its radially outermost end and a tubular portion 42 at its radially innermost end. An annular flange 37 extends form the tubular portion 42. A threaded surface for mating with the threaded surface 34 on the radially outer casing portion is provided on a shoulder portion 43 provided between the sealing plug 36 and the tubular portion 42. The enlarged sealing plug 36 has a greater radius/axial dimension than the radially outer casing bore and the tubular portion 42.

The segment seal 32 has a radially inner casing bore housing a radially inner portion 38 of the waveguide. The radially inner portion 38 has a sleeve portion 44 and a head portion 45 which are affixed (e.g. welded or screwed) to the segment seal 32.

The tubular portion 42 of the radially outer portion 35 is spaced from the head portion 45 of the radially inner portion 38 by a radial gap 39. This gap 39 is bridged by a sealing portion 40.

The sealing portion 40 has a deformable portion. The deformable portion may be formed of radially-extending deformable walls that create a bellows structure, as in the arrangement of FIG. 2. The radially outer end of the walls are welded to the annular flange 37 on the tubular portion 42 of the radially outer portion. The radially inner ends of the walls are provided with an annular mounting ring 49 which is biased against a mounting surface 41 on the radially inner portion 38.

The radially inner portion 38 comprises a bore 46 extending through the sleeve portion 44 and the head portion 45. The radially outer portion 35 comprises a bore 47 extending through the tubular portion 42 and the shoulder portion 43. The radius of the bore 46 in the radially inner portion 38 is smaller than the radius of the bore 47 in the radially outer portion 35 such that a step 48 is formed between the two portions. In other embodiments (not shown), the bores 46, 47 may be of the same radius and the step 48 may be absent.

During manufacture of the turbine, the radially inner portion 38 is affixed (e.g. welded or screwed) to the segment seal 32. This ensures that a tight seal is formed between the radially inner portion 38 and the segment seal so that no gas or heat can leak through into the radially inner casing bore.

After assembly of the turbine, the radially outer portion 35 and the sealing portion 40 are guided into the radially outer casing bore using the sealing plug 36 and the radially outer portion 35 is affixed to the radially outer casing portion 31 by threaded engagement between the threaded surface 34 and the corresponding threaded surface on the radially outer portion 35.

The annular mounting ring 49 of the sealing portion abuts and is biased to form a seal against the mounting surface 41 on the head portion 45 of the radially inner portion 38.

The sealing portion 40 seals the radially inner portion 38 and radially outer portion 35 and prevents pressure/heat leakage from the waveguide into the casing structure 30.

During use, a transmitter of a sensor system (not shown) emits a microwave signal that is guided down the wave guide from an aerial (not shown) on the sealing plug 36 of the radially outer portion 35 towards the radially inner portion 38.

A portion of the microwave signal is reflected from the step 48 between the two portions. The remainder of the signal passes through the radially inner portion 38 and is subsequently reflected from the tips of the rotary blades (not shown) back into the waveguide and radially outwards to the receiver of the sensor system. The receiver and transmitter of the sensor element may be the same item.

In other embodiments (not shown), the microwave signal may be reflected from an separate reflection feature or may be reflected by a change in the nature of bore material contained within the bores as discussed in US2011/0194122.

The sensor system can process the reflected signals as described in US 2011/0194122 to determine the clearance between the rotary blade tips and the inner surface of the segment seal 32.

When axial movement occurs in the casing structure 30 between the radially outer casing 31 and segment seal 32, the radially-extending deformable walls of the sealing portion 40 can deform to accommodate the movement.

Figure 3:
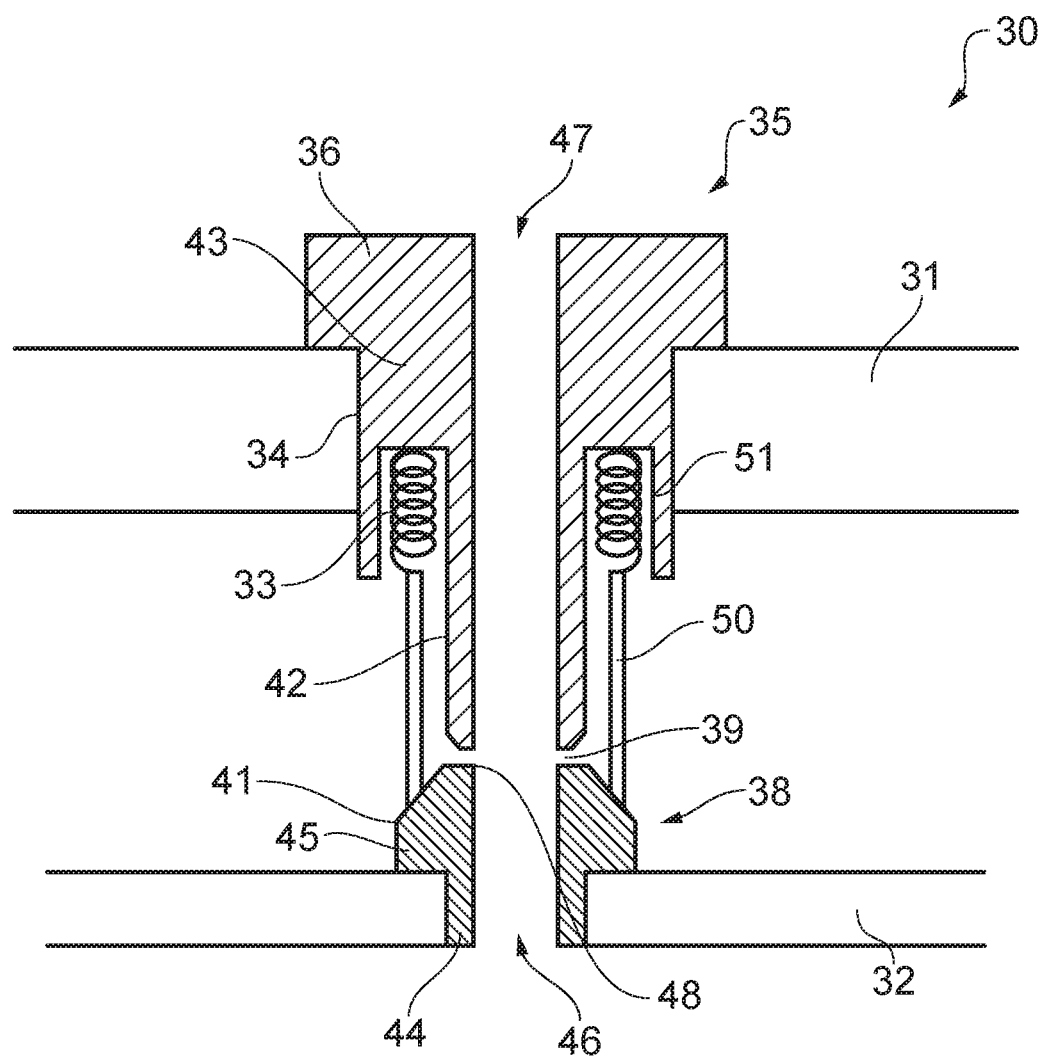
FIG. 3 shows a cross-section through the casing structure of a high pressure turbine according to a second arrangement.

FIG. 3 shows a second embodiment of the present invention where the deformable bellows, annular flange 37 and annular mounting ring 49 of the first embodiment are replaced with a spring portion 33 and rigid annular mounting walls 50. The shoulder portion 43 of the radially outer portion 35 is provided with a skirt portion 51 for retaining the spring portion 33.

Figure 4A:
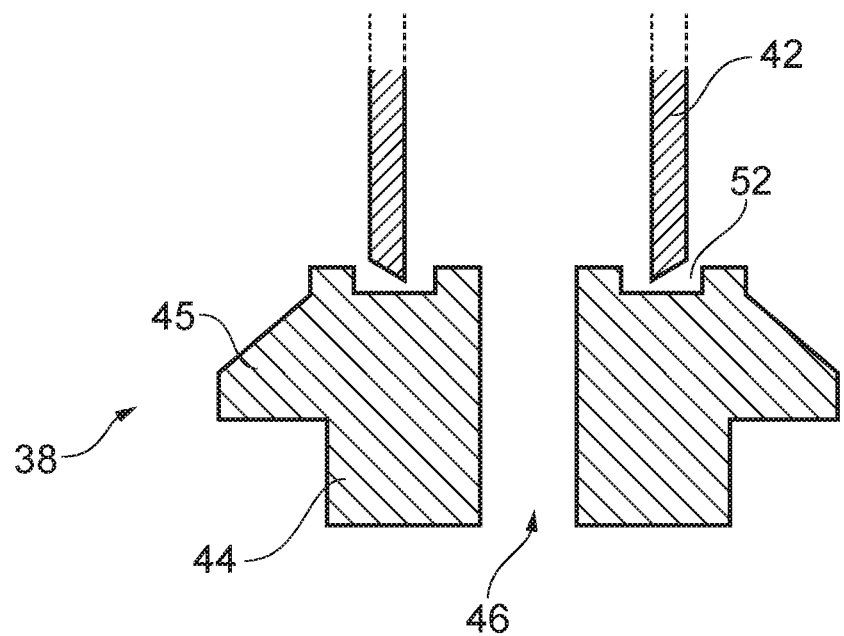
FIGS. 4a and 4b show two alternative arrangements for the radially inner ends of the radially outer portion which could be used in any aspect, such as the arrangements of FIGS. 2 and 3.
Figure 4B:
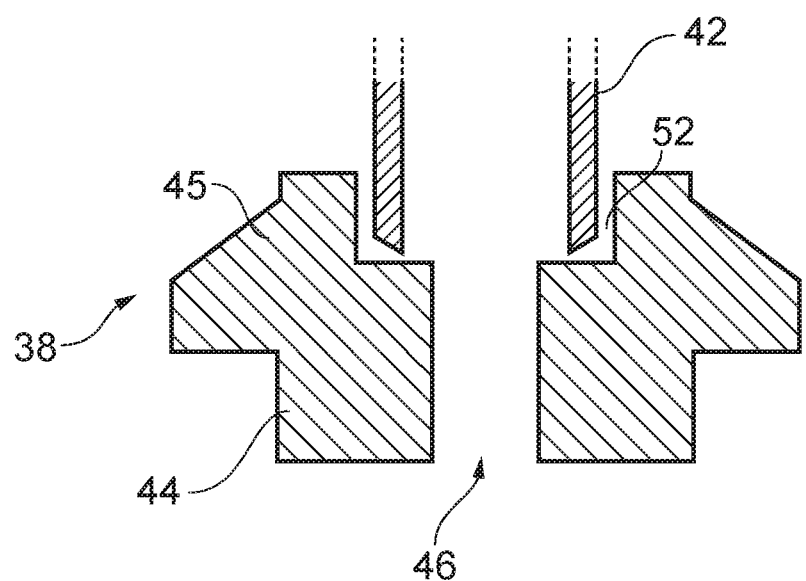

FIGS. 4a and 4b show two alternative arrangements for the radially inner ends of the radially outer portion which could be used in the first or second embodiments.

As shown in FIG. 4a, the head portion 45 of the radially inner portion 38 has a groove 52 for receiving the radially inner ends of the tubular portion 42 of the radially outer portion 35.

As shown in FIG. 4b, the groove 52, may be contiguous with the bore 46 of the radially inner portion 38.

While the disclosure has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. A gas turbine engine comprising:
   a casing structure including a radially outer casing portion and a radially inner casing portion; and
   a sensor system configured to measure a clearance between a rotary blade and the casing structure, the sensor system including: (i) a transmitter configured to transmit an electromagnetic signal, (ii) a waveguide coupled with the transmitter, the waveguide being configured to guide the electromagnetic signal radially inwards through the casing structure, and guide a reflected electromagnetic signal radially outward through the casing structure, and (iii) a receiver configured to receive the reflected signal, the waveguide including:
   a radially outer portion configured to be mounted on the radially outer casing portion of the casing structure, the radially outer portion including a bore extending in a radial direction through the radially outer portion, the bore being configured to allow passage of the electromagnetic signal;
   a radially inner portion configured to be mounted on the radially inner casing portion of the casing structure, the radially inner portion projecting radially outwards towards the radially outer portion, the radially inner portion including a bore configured to allow passage of the electromagnetic signal, the bore of the radially inner portion being open at a radially inner end, the radially outer portion and the radially inner portion being separate from each other; and
   a sealing portion configured to extend between the radially outer portion and the radially inner portion, the sealing portion being configured to form a seal between the radially inner portion and the radially outer portion, the sealing portion including a deformable portion.

2. The gas turbine engine according to claim 1, wherein the radially outer portion includes an enlarged sealing plug at a radially outermost end of the radially outer portion.

3. The gas turbine engine according to claim 1, wherein the radially outer portion includes a threaded portion for mating engagement with the radially outer casing portion.

4. The gas turbine engine according to claim 1, wherein the radially inner portion includes a threaded portion for mating engagement with the radially inner casing portion.

5. The gas turbine engine according to claim 1, wherein the bore of the radially inner portion has a smaller diameter than the bore of radially outer portion.

6. The gas turbine engine according to claim 1, wherein the deformable portion includes a radially-extending flexible or corrugated wall portion.

7. The gas turbine engine according to claim 1, wherein the sealing portion is affixed to the radially outer portion and the deformable portion biases the sealing portion against the radially inner portion.

8. The gas turbine engine according to claim 1, wherein:
   the radially outer portion is mounted in the radially outer casing portion; and
   the radially inner portion is mounted in or integral with the radially inner casing portion.

9. The gas turbine engine according to claim 8, wherein the casing structure is a fan casing structure, compressor casing structure or turbine casing structure.

10. The gas turbine engine according to claim 8, wherein the radially inner casing portion is a segment seal and the segment seal is radially spaced from the radially outer casing portion by a segment carrier.

11. The gas turbine engine according to claim 10, wherein the radially inner portion is integral with the segment seal.

12. The gas turbine engine according to claim 8, wherein the radially outer portion is welded to the radially outer casing portion.

13. The gas turbine engine according to claim 8, wherein the radially inner portion is integral with the radially inner casing portion.

* * * * *